(12) United States Patent
Brinkmann et al.

(10) Patent No.: US 8,205,836 B2
(45) Date of Patent: Jun. 26, 2012

(54) FIRE PROTECTION DEVICE FOR AN AIRCRAFT OR SPACECRAFT

(75) Inventors: Falk Brinkmann, Tostedt (DE); Heinz-Peter Busch, Weyhe (DE); Berend Schoke, Twistringen (DE)

(73) Assignee: Airbus Deutschland GmbH, Hamburg (DE)

( * ) Notice: Subject to any disclaimer, the term of this patent is extended or adjusted under 35 U.S.C. 154(b) by 1385 days.

(21) Appl. No.: 12/001,482

(22) Filed: Dec. 11, 2007

(65) Prior Publication Data

US 2010/0276539 A1 Nov. 4, 2010

Related U.S. Application Data

(60) Provisional application No. 60/874,593, filed on Dec. 13, 2006.

(30) Foreign Application Priority Data

Dec. 13, 2006 (DE) .......................... 10 2006 058 902
Sep. 28, 2007 (DE) .......................... 10 2007 046 479

(51) Int. Cl.
B64D 45/00 (2006.01)
E05F 15/20 (2006.01)
A62C 3/08 (2006.01)

(52) U.S. Cl. .................. 244/129.2; 244/121; 244/129.4; 49/1; 169/48; 169/62

(58) Field of Classification Search ............... 244/117 R, 244/118.5, 119, 129.1, 129.2, 129.4, 121; 49/1, 7; 169/48, 49, 50, 62

See application file for complete search history.

(56) References Cited

U.S. PATENT DOCUMENTS

| 4,383,666 | A | * | 5/1983 | Allerding et al. | 244/118.5 |
| 4,646,993 | A | * | 3/1987 | Baetke | 244/117 R |
| 4,703,908 | A | * | 11/1987 | Correge et al. | 244/118.5 |
| 4,899,962 | A | * | 2/1990 | Mueller | 244/129.2 |
| 5,118,053 | A | * | 6/1992 | Singh et al. | 244/118.5 |
| 5,397,080 | A | * | 3/1995 | Berg | 244/129.2 |
| 5,554,433 | A | * | 9/1996 | Perrone et al. | 428/192 |
| 6,129,312 | A | * | 10/2000 | Weber | 244/118.5 |
| 6,484,784 | B1 | * | 11/2002 | Weik et al. | 160/7 |
| 6,491,254 | B1 | * | 12/2002 | Walkinshaw et al. | 244/118.5 |
| 7,191,845 | B2 | * | 3/2007 | Loar | 169/48 |
| 7,232,097 | B2 | * | 6/2007 | Noiseux et al. | 244/121 |
| 2007/0164158 | A1 | * | 7/2007 | Buchholz et al. | 244/119 |

FOREIGN PATENT DOCUMENTS

| DE | 10358978 | 8/2005 |
| WO | WO 93/19984 | 10/1993 |
| WO | WO 03/037313 | 5/2003 |

\* cited by examiner

*Primary Examiner* — Tien Dinh
*Assistant Examiner* — Joseph W Sanderson
(74) *Attorney, Agent, or Firm* — Jenkins, Wilson, Taylor & Hunt, P.A.

(57) ABSTRACT

A fire protection device for an aircraft or spacecraft is disclosed. The fire protection device can include a fireproof bulkhead and an adjusting device, the fireproof bulkhead can be adjusted from a ventilating position I into a screening position II. This may prevent a stream of smoke and heat from penetrating into the cabin when there is a fire underneath the fuselage.

14 Claims, 8 Drawing Sheets

(A)

(D-D)

(A)

(C)

(B)

FIRE PROTECTION DEVICE FOR AN AIRCRAFT OR SPACECRAFT

CROSS-REFERENCE TO RELATED APPLICATIONS

This application claims the benefit of U.S. Provisional Application No. 60/874,593, filed Dec. 13, 2006, German Patent Application No. 10 2006 058 902.5 filed Dec. 13, 2006 and German Patent Application No. 10 2007 046 479.9 filed Sep. 28, 2007, the entire disclosures of which are herein incorporated by reference.

FIELD OF THE INVENTION

The present invention relates to a fire protection device for an aircraft or spacecraft and to an aircraft or spacecraft with such a fire protection device.

BACKGROUND OF THE INVENTION

Although it can be applied to any desired aircraft or spacecraft, the present invention and the problems on which it is based are explained in more detail with reference to a passenger aircraft.

FIG. 9 shows a view of a cross section of a fuselage 1 of a conventional airliner. A floor 2 separates the fuselage in the vertical direction into a cabin 3 at the top, indicated by seats 4, and an underfloor space 5 at the bottom. The underfloor space 5 has a dividing wall 6, which is substantially airtight for fire protection reasons and divides the underfloor space 5 into an interior freight area 7 and a peripheral area 8 surrounding the said freight area and adjoining the fuselage shell 9.

During the operation of the aircraft, an air-conditioning system (not represented any further) produces a stream of air 12, which passes air from the cabin 3 into a drainage channel 13 provided in the lower region of the fuselage shell 9. In this region, referred to here as the fuselage floor, there is typically an aperture in the thermal insulation 14, which surrounds the fuselage shell 9 on its inner circumference. On account of the missing insulation, the region is much colder than the insulated regions of the fuselage shell 9 as a result of the cold atmosphere, in particular during the flight phase. This leads to condensation of water vapour in the stream of air 12. The condensate can consequently be carried away in a controlled manner by means of the drainage channel 13.

If, however, there is a fire 16 with a strong development of heat under the lower region of the fuselage shell 9 having the drainage channel 13, for example caused by a burning pool of kerosene on the runway, the missing insulation in the region of the drainage channel 13 proves to be very disadvantageous. The thin fuselage shell 9 burns through within a few seconds and there is the risk of a chimney effect, in which a stream of smoke and heat 17 penetrates into the cabin 3 in an extremely short time, potentially having serious consequences for the passengers.

SUMMARY OF THE INVENTION

One aspect of the present invention therefore provides a fire protection device for an aircraft or spacecraft and an aircraft or spacecraft with such a fire protection device which protects passengers from a fire, in particular underneath a fuselage shell. A further aspect of the present invention provides a suitable trigger mechanism, in particular for such a fire protection device.

Accordingly, a fire protection device with a fireproof bulkhead and an adjusting device is provided. The fireproof bulkhead can be adjusted by means of the adjusting device from a ventilating position into a screening position.

Furthermore, an aircraft or spacecraft with such a fire protection device is provided. The aircraft or spacecraft has in this case a dividing wall, an outer wall, and a gap between the dividing wall and the outer wall.

Furthermore, a trigger mechanism is provided, in particular for such a fire protection device, with at least two elements, which are adhesively attached to one another, in particular in certain portions, by means of an intumescent adhesive, and which are provided in relation to one another in such a way that a tensile and/or shearing stress in the intumescent adhesive is unequal to zero.

The idea on which the present invention is based is that, in the example described above, in the normal case air can be exchanged unhindered between the cabin and the peripheral area 8 assigned to the drainage channel 13, for example for extracting condensate. In the case of a fire, the fireproof bulkhead can then be adjusted in such a way that it screens the cabin 3 from a stream of smoke and heat, in particular caused by a fire in the region of the drainage channel 13.

The tensile and/or shearing stresses in the intumescent adhesive of the trigger mechanism are caused by loads acting on the elements, in particular the gravitational force, for example if the elements are flexibly formed and are respectively held at their end remote from the adhesive attachment. Alternatively or in addition, spring elements which tensionally load the two elements relative to one another may be provided for example. In the normal case, the intumescent adhesive holds the two elements together. In the case of a fire, the intumescent adhesive loses its adhesive effect and releases the two elements. On account of the loads then no longer capable of being absorbed in the adhesive, movement of the two elements in relation to one another occurs. Because of the expansion of intumescent adhesives, only very small loads are necessary to separate the two elements from one another or the expansion even brings about an active repulsion of the elements from one another. Such a trigger mechanism is for example well suited in particular for triggering the adjustment of the fireproof bulkhead of the fire protection device described above from the ventilating position into the screening position.

According to a particular embodiment of the invention, in the ventilating position the fireproof bulkhead exposes a gap between a dividing wall and an outer wall of the aircraft or spacecraft for ventilating a fuselage floor. Ventilating the fuselage floor is desirable for the reasons already described above, but also when there is a rapid loss of pressure in the fuselage.

In the case of a further embodiment of the invention, in the screening position the fireproof bulkhead seals the gap to provide a screen against a fire in the region of the fuselage floor. The sealing of a gap is technically very easy to achieve, but effectively prevents the stream of smoke and heat from flowing into the cabin.

In the case of a further embodiment of the present invention, the adjusting device adjusts the fireproof bulkhead in the case of a fire from the ventilating position into the screening position. Such control of the fireproof bulkhead allows switching over from the ventilating position to the screening position only in the case of an emergency. However, in other configurations it is also conceivable to adjust the fireproof bulkhead from the screening position into the ventilating position in the case of a fire.

According to a further embodiment of the present invention, the adjusting device has a pivot axis, about which the fireproof bulkhead can be pivoted from the ventilating position into the screening position. Such an adjustment can very easily be put into practice in structural terms. The pivot axis may be provided on a peripheral portion of the fireproof bulkhead assigned to it, for example in the form of a bearing or a flexible material.

"Pivotable" is not only meant here to mean pivoting of a relatively rigid element about a pivot axis formed as a bearing. Rather, all embodiments in which an element designed for closing a gap or the like is moved about one or more axes are intended to be covered here.

In the case of a further embodiment of the invention, the adjusting device has holding means, which hold the fireproof bulkhead in the ventilating position and release the fireproof bulkhead for movement of the same into the screening position. Such holding means prevent the fireproof bulkhead from also moving out of the ventilating position in the normal case, that is not in the case of a fire, for example under the effect of gravitational force, and consequently adversely affecting the ventilation of a fuselage floor of the aircraft or spacecraft.

The holding means may be provided on a peripheral portion lying opposite the peripheral portion assigned to the pivot axis. Furthermore, the holding means may comprise a bimetal, a memory alloy and/or a fusible element, in particular of plastic or solder. Holding means formed in such a way have two functions. On the one hand, in the normal case they hold the fireproof bulkhead in the ventilating position. On the other hand, in the case of a fire they release the fireproof bulkhead for adjustment into the screening position, for example by means of a biased spring. The holding means described share the common feature that they change their outer shape under the effect of heat, in the present case for example by the effect of heat that corresponds to that of a fire.

In the case of a further embodiment of the invention, the fireproof bulkhead is formed as a curtain and/or a flap. A flap has the advantage that it can be stably formed, and consequently can withstand in the screening position a vigorous stream of smoke and heat resulting from a fire. In the case where a gap with an uneven geometry is to be covered, a fireproof bulkhead formed as a curtain is advantageous. Such an uneven geometry may be caused for example by systems, such as for example pipelines, that are routed along the fuselage shell of the aircraft or spacecraft. "Curtain" is meant to mean here any type of dimensionally unstable, for example sheet-like element. Such an element then lays itself comparatively snugly around the systems, that is for example pipelines, in the screening position, and consequently seals off the cabin better from the stream of smoke and heat resulting from the fire.

According to a further embodiment of the present invention, the flap may have clearances for receiving aircraft systems in the screening position. If a flap is intended to be used for sealing off the uneven gap described above, it should be provided with corresponding clearances for reasons of impermeability, in order that the flap lies flush against them.

In the case of a further embodiment of the present invention, the flap may consist of glass fiber material and has a fastening portion, comprising a cured matrix, a matrix-free bearing portion, adjoining the said fastening portion, and a pivoting portion, pivotably fastened to the fastening portion by means of the bearing portion and comprising a cured matrix. Such a flap comprises just one part and is therefore very easy to produce and to fit.

According to a further embodiment of the invention, the fireproof bulkhead has at least one element of spring wire, bimetal and/or a memory alloy for adjusting the fireproof bulkhead between the ventilating position and the screening position. Such an element allows automatic adjustment of the fireproof bulkhead in the case of a fire. The operating principles are in this case the same as those already described above for the holding means. An automatic return, that is for example from the screening position into the ventilating position, may also be provided.

The element may in this case formed as a rib, in particular as a longitudinal or transverse rib. A number of such ribs, for example in a fireproof bulkhead formed as a curtain, may make the fireproof bulkhead lie very snugly against and between the systems at a number of points.

In the case of a further embodiment of the invention, the curtain can be fastened to the dividing wall and/or outer wall on at least one side by adhesive attachment, in particular by means of a non-heat-resistant adhesive, or sewing, in particular by means of a non-heat-resistant filament. In this case, the curtain could, for example, be fastened on opposite sides by means of an adhesive or textile seam, these seams having different melting temperatures, so that in the case of a fire just one seam is destroyed, so that the curtain is released for pivoting into the screening position. In the case of this embodiment, the holding means described above is formed as a disintegrating, in particular melting, adhesive or textile seam.

The fire protection device may be attached to the dividing wall on one side. It could, however, also be attached to the outer wall. "Dividing wall" and "outer wall" are meant here to mean any kind of walls that between them define a gap intended for ventilation, with the risk that a stream of smoke and/or heat is passed through this gap in the case of a fire.

According to a further embodiment of the fire protection device according to the invention, the fireproof bulkhead has a curtain on the dividing wall side and a curtain on the outer wall side, it being possible for the curtain on the dividing wall side to be fastened at its one end to a structure on the dividing wall side of the aircraft or spacecraft and for the curtain on the outer wall side to be fastened at its one end to a structure on the outer wall side of the aircraft or spacecraft, the curtain on the dividing wall side and the curtain on the outer wall side being fastened to one another at the respective other end by means of a non-heat-resistant adhesive in the ventilating position. "Non-heat-resistant" means in the present case that the adhesive loses its adhesive effect in the case of a fire. When there is no adhesive effect, the two curtains come apart from one another as a result of the gravitational force acting on them. As a consequence, the curtain on the outer wall side assumes the screening position.

According to a further embodiment of the fire protection device according to the invention, the adhesive is formed as an intumescent material. An "intumescent material" is understood in the present case as meaning a material that expands under the effect of intense heat, as is typical in the case of a fire. With preference, the intumescent material is based on an epoxy resin.

For effective fire protection, it is desirable that the adhesive loses its adhesive effect within an extremely short time, and consequently for example releases the curtain on the outer wall side for pivoting into the screening position. The weight of the curtains also plays a role here: the heavier the curtains, the more quickly the remaining adhesive effect can be overcome. However, a higher weight is always disadvantageous in air travel and space travel.

It has surprisingly been possible in experiments to minimize the time period between the beginning of a fire and the pivoting of the curtain on the outer wall side into the screening position by means of the intumescent adhesive, even for curtains with a low weight. Thermoplastic adhesives were also experimentally investigated for example. However, it was thereby found that, after melting, they are absorbed by the glass fiber material of the curtains, subsequently carbonize and lose their adhesive effect much less. Intumescent adhesives are therefore to be preferred over thermoplastic adhesives.

In the case of a further embodiment of the fire protection device according to the invention, the other ends respectively of the curtain on the dividing wall side and the curtain on the outer wall side overlap in certain portions, and the non-heat-resistant adhesive is provided between the overlapping other ends respectively. By means of the overlapping, an adequate amount of adhesive to provide a reliable connection between the curtain on the dividing wall side and the curtain on the outer wall side in the case where there is no fire can easily be introduced between the ends.

According to a further embodiment of the fire protection device according to the invention, the curtain on the outer wall side has a greater length—the "length" of the curtain is meant to mean here the extent approximately in the transverse direction of the aircraft or spacecraft—than the curtain on the dividing wall side. The curtain on the outer wall side forms the actual fireproof bulkhead and must therefore seal off the entire gap. By contrast, the curtain on the dividing wall side, on the other hand, has the sole function of holding the curtain on the outer wall side in the ventilating position. To this extent, it saves material to form it as a short curtain.

In the case of a further embodiment of the invention, the fireproof bulkhead comprises a plastic, in particular a glass fiber material, in particular S-glass, and/or glass fiber fabric, and/or a metal and/or a metal alloy and/or a metal mesh. All these materials can be of a heat-resistant form and are consequently suitable for providing a screen against a stream of smoke and heat.

BRIEF DESCRIPTION OF THE DRAWINGS

The invention is explained in more detail below on the basis of exemplary embodiments with reference to the accompanying figures of the drawing, in which.

In the figures, the same reference numerals designate components that are the same or functionally the same, unless otherwise indicated.

DETAILED DESCRIPTION OF THE INVENTION

Figure 1:
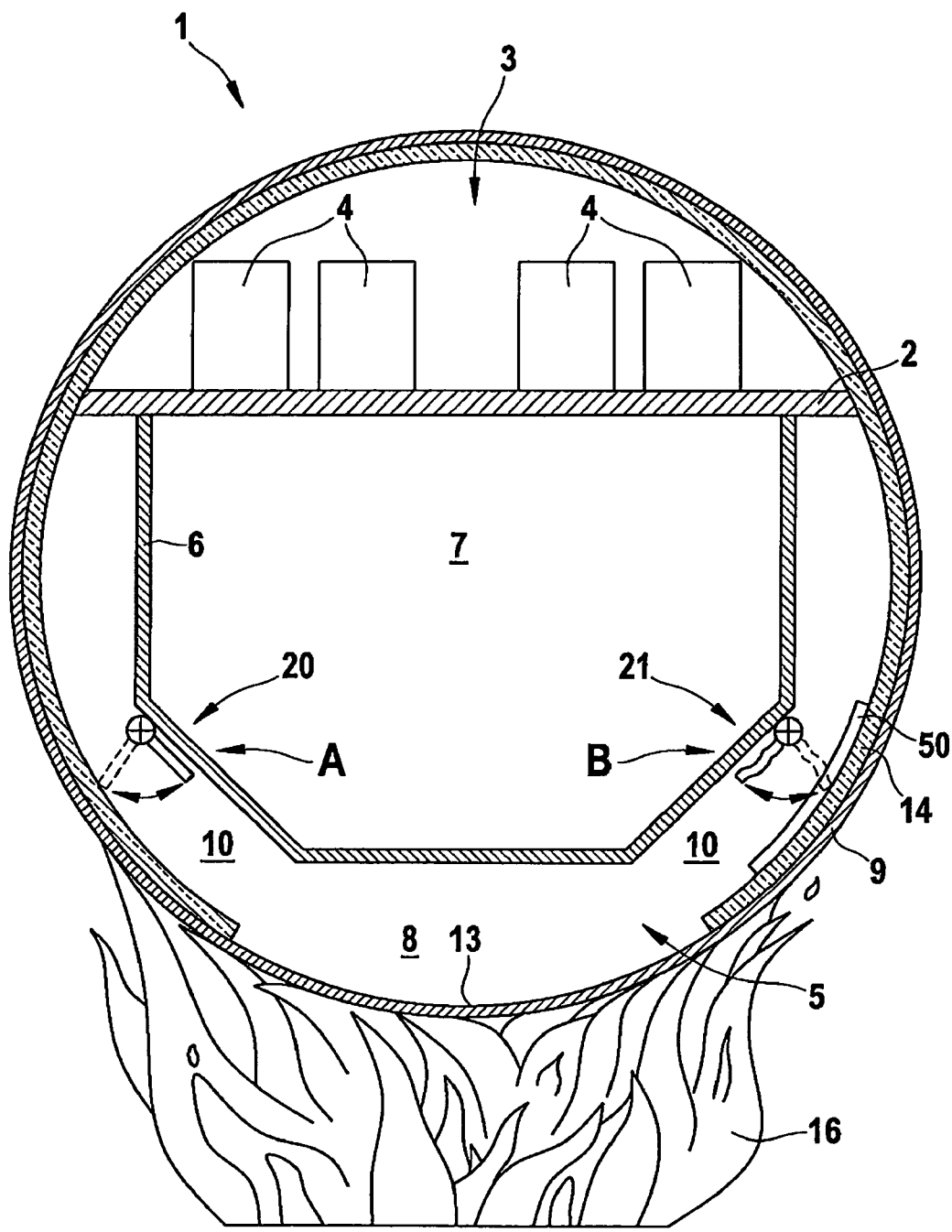
FIG. 1 shows a view of a cross section of an aircraft fuselage with two fire protection devices according to two exemplary embodiments of the present invention.

FIG. 1 shows in a cross-sectional view the aircraft fuselage 1 already described at the beginning. In addition, the fuselage 1 has a left-hand fire protection device 20 and a right-hand fire protection device 21. In reality, these are preferably identically formed. For illustrative purposes, however, the fire protection devices 20, 21 are represented differently, and consequently represent two different, though not mutually exclusive, exemplary embodiments of the invention.

The fire protection device 20 is represented in more detail in FIGS. 2, 2A, 3 and 3A.

Together with the dividing wall 6 of a freight area 7, an insulation 14 applied to the fuselage shell 9 defines a gap 10, which extends in the longitudinal direction of the fuselage 1. Through the gap 10, in the normal case air can be exchanged between the cabin 3 and the peripheral area 8 assigned to the drainage channel 13.

Figure 2:
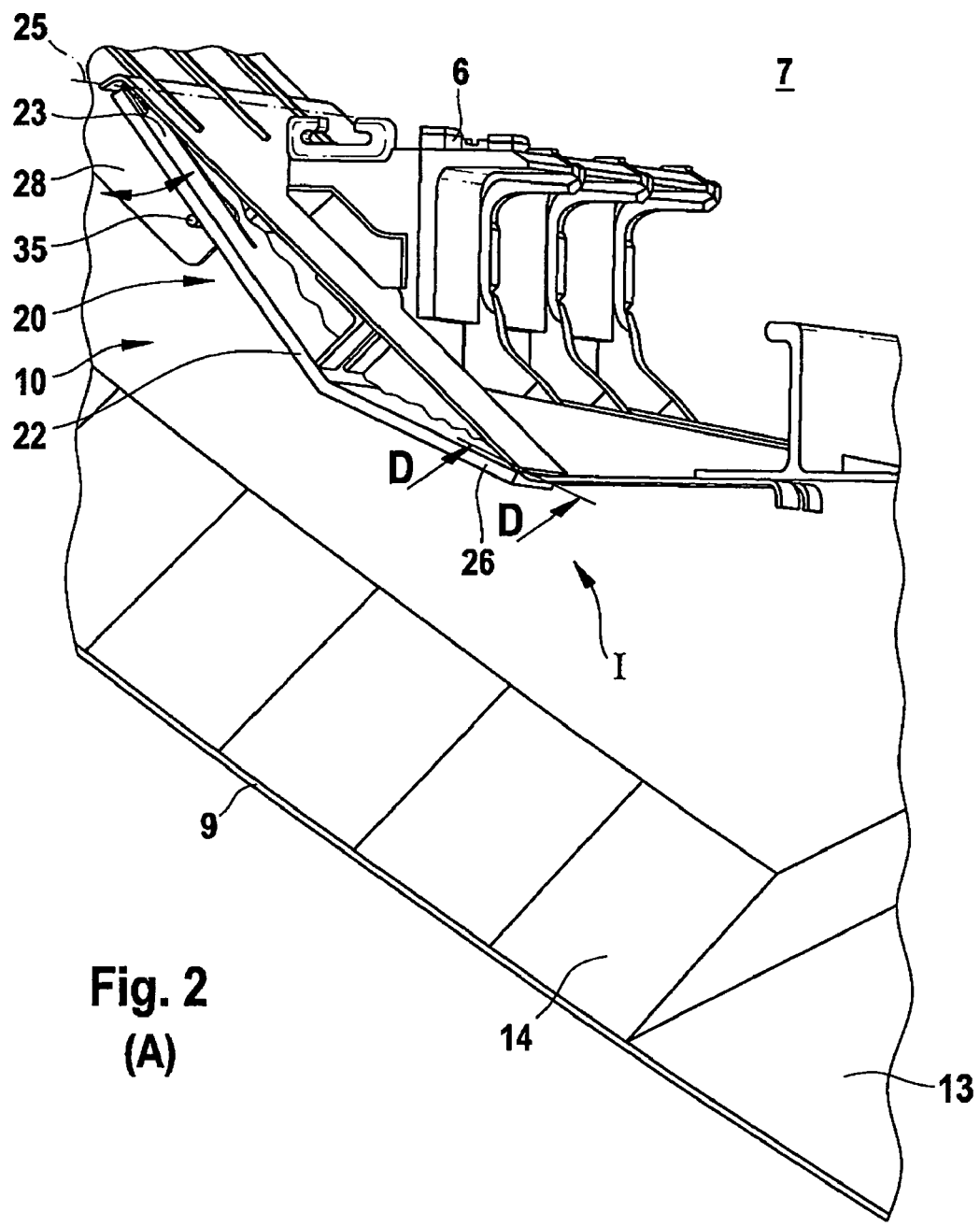
FIG. 2 shows an enlarged and perspective view A of the first exemplary embodiment from FIG. 1, the fireproof bulkhead being in a ventilating position.
Figure 5:
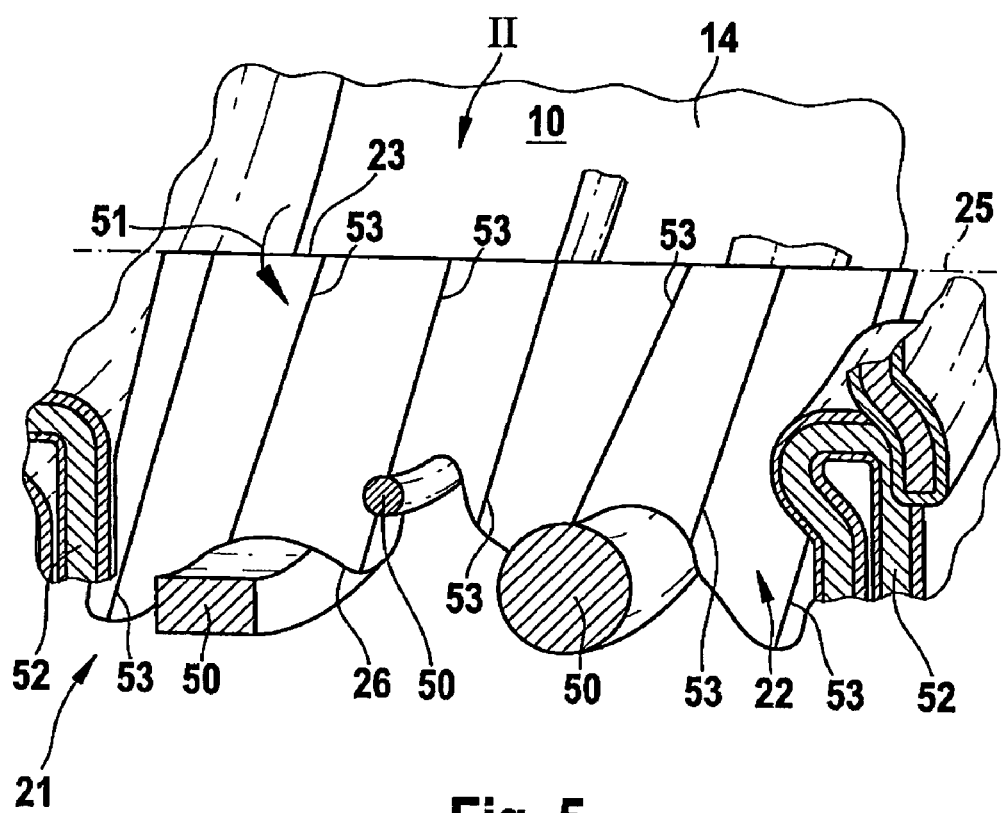
FIG. 5 shows an enlarged and perspective view B from FIG. 1 of a fire protection device according to the second exemplary embodiment of the invention.

The fire protection device 20 has a fireproof bulkhead 22, which is formed as a rigid, preferably angled-away, panel. To allow it to be represented better, the fireproof bulkhead 22 is shown broken away, but preferably extends along the entire length of the cabin 3, or just along a frame section in each case, as shown in FIG. 5. In FIG. 2, the fireproof bulkhead 22 is in the ventilating position I and thereby exposes the gap 10.

Figure 3:
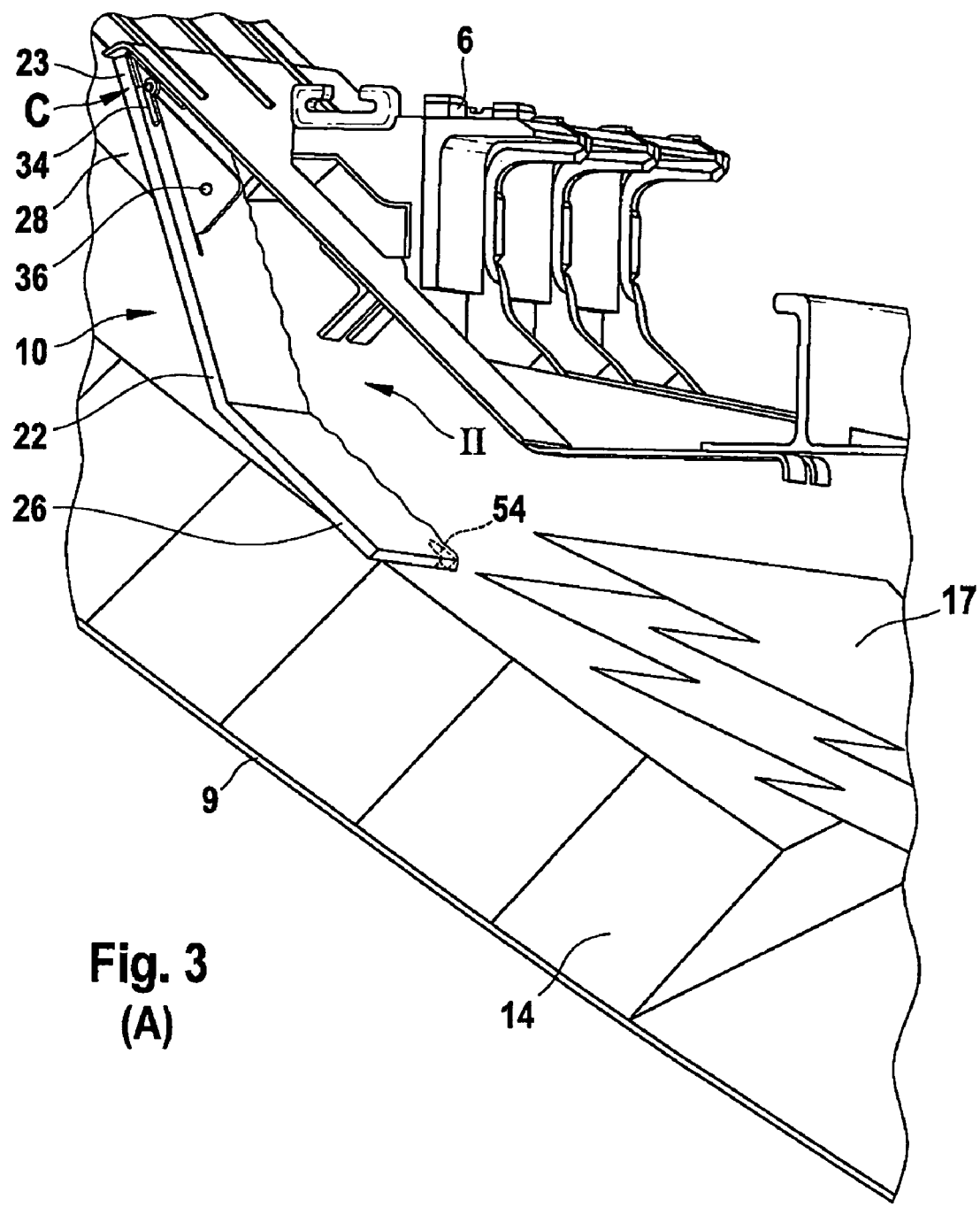
FIG. 3 shows the view A from FIG. 1, the fireproof bulkhead being in the screening position.
Figure 3A:
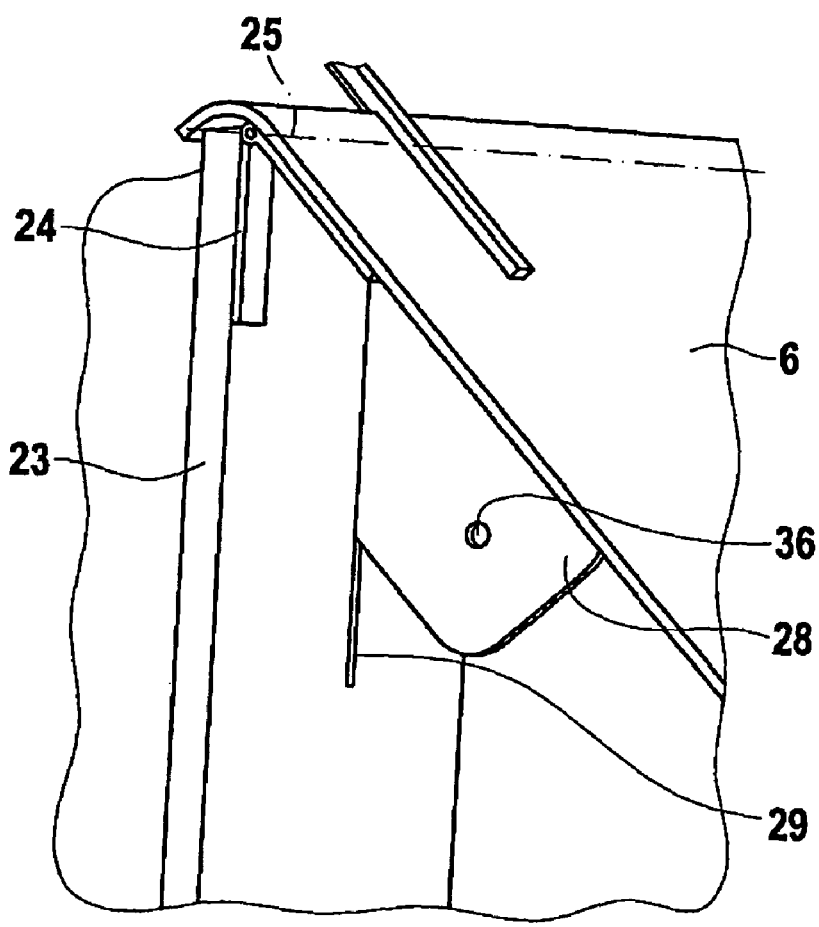
FIG. 3A shows an enlarged view C from FIG. 3.

As in the enlarged view C from FIG. 3 that is shown in FIG. 3A, the fireproof bulkhead 22 is provided pivotably about a pivot axis 25 at its rear end 23, by means of a hinge 24 provided on the dividing wall 6. Also preferably provided on the dividing wall 6, perpendicularly to it, is a panel 28, which engages in a slit 29 in the rear end 23 of the fireproof bulkhead for guiding and stabilizing the latter in the screening position II.

Figure 2A:
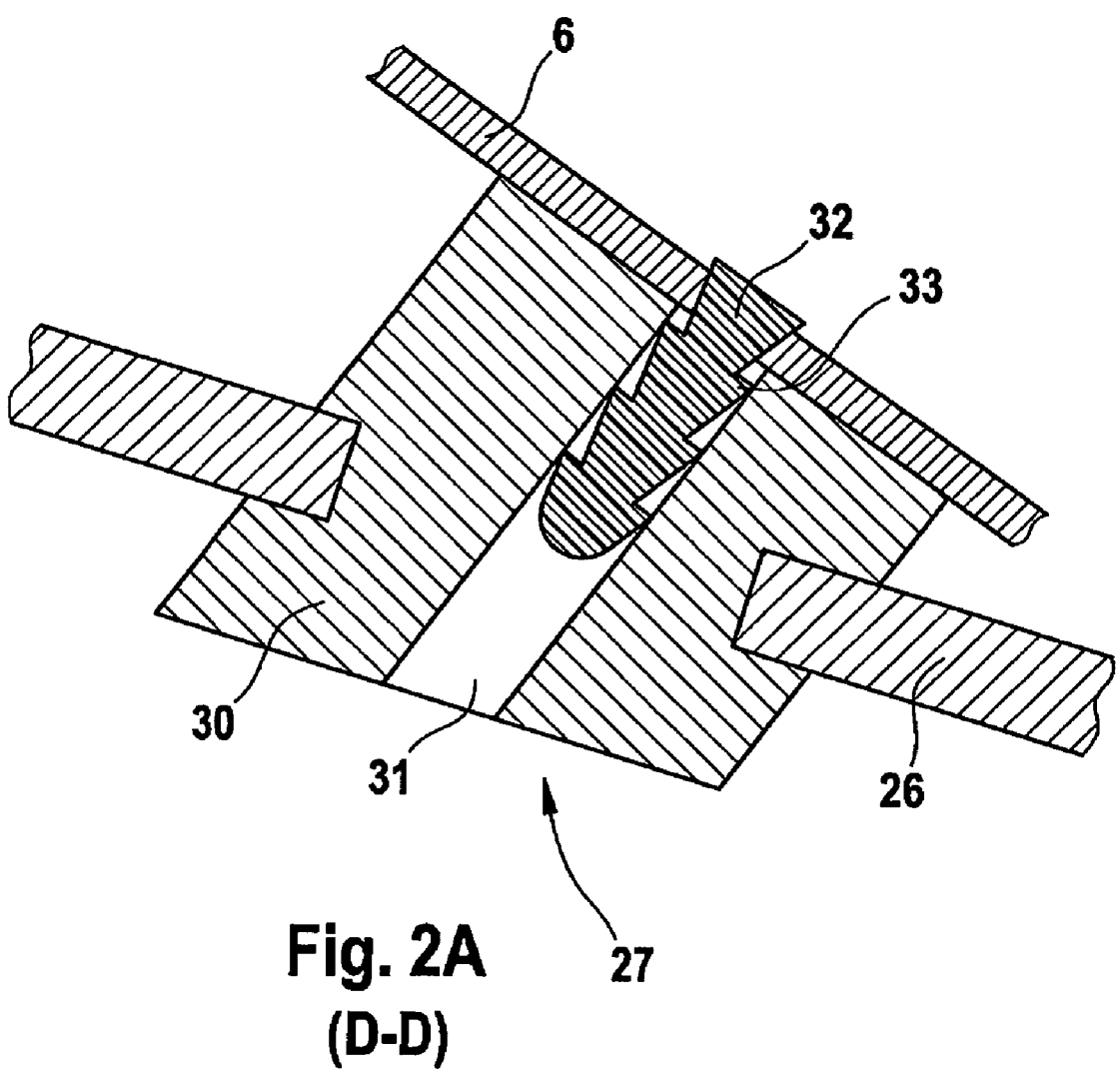
FIG. 2A shows an enlarged view of a section along the sectional line D-D from FIG. 2.

As shown in FIG. 2A, the fireproof bulkhead 22 is releasably fastened at its front end 26 to the dividing wall 6 by way of holding means 27. The holding means 27 comprise a bush 30, which is fixedly provided at the front end 26 of the fireproof bulkhead 22, and has a bore 31 for receiving a pin 32. The pin 32 is fixedly received at its rear end in the dividing wall 6 and frictionally engages at its front end in the bore 31. For this purpose, the pin 32 is elastically pressed into the bore 31 and has tines 33 running around its circumference. Furthermore, the pin 32 is formed from an elastic material, which melts and/or shrinks under the effect of heat.

If a fire 16 occurs, as represented in FIG. 1, in particular underneath the fuselage shell 9 in the region that is assigned to the drainage channel 13 and does not have any insulation 14, the fuselage shell 9 burns through in this region in an extremely short time. A stream of smoke and heat 17, as shown in FIG. 3, then rises up towards the cabin 3 through the gap 10 formed between the dividing wall 6 and the insulation 14.

The stream of smoke and heat 17 causes the material of the pin 32 to melt and this pin consequently releases the front end 26 of the fireproof bulkhead 22 to pivot about the pivot axis 25. For this purpose, the fireproof bulkhead 22 is preferably provided such that it is spring-biased about the pivot axis 25, as indicated by the leg spring 34. Alternatively, the actuation of the fireproof bulkhead 22 for pivoting may also take place under the effect of gravitational force.

The front end 26 then pivots until it comes to lie against the insulation 14, and is consequently in the screening position II, the gap 10 being sealed in a substantially gastight manner.

Since the insulation 14 is formed from a relatively soft material, such as for example glass wool, a certain sinking of the front end into the insulation 14 advantageously occurs, whereby impermeability of the overall fire protection device 20 with respect to the stream of smoke and heat is increased. Consequently, penetration of the stream of smoke and heat 17 into the cabin 3 can be prevented, or at least minimized.

As an alternative to the holding means 27 shown in FIG. 2A, a fusible pin 35, as represented in FIG. 2, for example of solder or plastic, could also be fitted through a receptacle 36 (which can only be seen in FIGS. 3 and 3A) of the panel 28 for holding the fireproof bulkhead 22 in the ventilating position I, pivoting of the fireproof bulkhead 22 being blocked.

In the case of a fire, the pin 35 then melts and releases the fireproof bulkhead 22 for pivoting.

Figure 4:
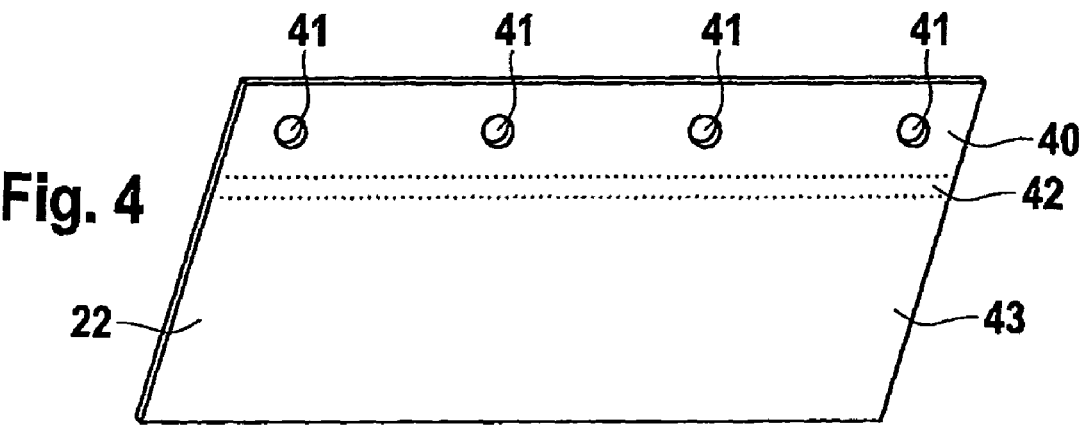
FIG. 4 shows a fireproof bulkhead according to a further exemplary embodiment of the invention.

FIG. 4 shows an alternative form of the fireproof bulkhead 22 according to FIG. 2.

The fireproof bulkhead 22 is formed as a two-part flap and consists substantially of glass fiber material. The glass fiber material has a fastening portion 40, which is provided with holes 41 for fastening to the dividing wall 6. In this case, the fastening portion 40 is cured by means of a matrix introduced into its glass fiber material. Furthermore, the fireproof bulkhead 22 has a bearing portion 42 adjoining the fastening portion 40, this bearing portion only having glass fibers and no matrix. Consequently, the bearing portion 42 is flexible and may act as a joint for a pivoting portion 43, which adjoins the said bearing portion and is in turn formed in a cured manner by means of a matrix. It goes without saying that any other desired fiber materials, for example carbon fibers, may be used instead of glass fibers.

FIG. 5 shows in an enlarged view B from FIG. 1 a fire protection device 21 according to a second exemplary embodiment of the present invention.

As indicated in FIGS. 1 and 5, systems 50 of the aircraft, such as for example pipelines or power lines, are laid in many regions of the fuselage shell 9. These systems may in this case be laid above or below the insulation 14, but usually result in an uneven geometry of the gap 10. In such cases, it is advantageous to use a fireproof bulkhead 22 formed as a curtain.

For simplified representation, the dividing wall 6 is not shown in FIG. 5. In FIG. 5, frames 52 covered by the insulation 14, which represent further obstacles in addition to the systems 50 with respect to pivoting of the fireproof bulkhead 22, are also represented.

In FIG. 5, the fireproof bulkhead 22 is shown in the screening position II, it being arranged such that it is pivoted downwards about the pivot axis 25, indicated by the arrow 51. The fireproof bulkhead 22 is preferably formed from a very heat-resistant, dimensionally unstable material, for example heat-resistant S-glass fabric (glass fiber fabric) or carbon fiber fabric.

Furthermore, the fireproof bulkhead 22 preferably has longitudinal ribs 53, which extend substantially perpendicularly in relation to the pivot axis 25. The longitudinal ribs 53 preferably comprise a spring steel, a bimetal and/or a memory alloy. Alternatively, the longitudinal ribs 53 may also be rigidly formed, pivoting of the fireproof bulkhead 22 then taking place for example by means of gravitational force.

In the case where a spring steel is used, fastening of the front end 26 in the way represented in FIG. 2A is possible for example. If a bimetal or a memory alloy is used, the ribs 53 may be formed in such a way that in the normal case, that is without the effect of heat, they lie against the dividing wall 6, as represented in FIG. 1. In the case of a fire, the ribs 53 are then deformed downwards, as indicated by the arrow 51, and then make the fireproof bulkhead 22 lie snugly against the systems 50 and/or the frames 52. In order to make it possible for the comparatively stiffly formed fireproof bulkhead 22 from FIG. 3 to lie snugly in this way, it would have to be provided with corresponding, interruptedly represented clearances 54.

At its rear end 23, the fireproof bulkhead 22 may, for example, be fastened to the dividing wall 6 by a heat-resistant filament or by means of an adhesive seam, on a comparatively narrow portion. This then forms the pivot axis 25.

Also at a front end 26, the fireproof bulkhead 22 may be fastened to the dividing wall 6 for example by a non-heat-resistant textile filament or adhesive instead of the holding means 27 shown in FIG. 2A.

Figure 6:
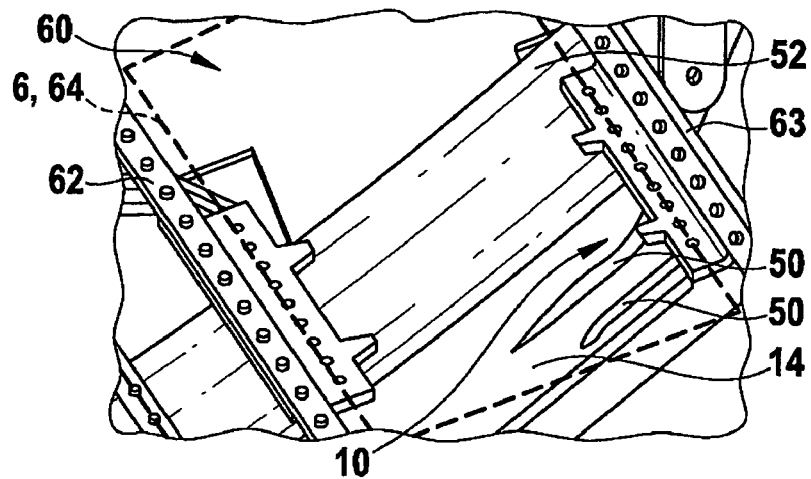
FIG. 6 shows a perspective view of an installation region for a fire protection device according to a third exemplary embodiment of the present invention.

FIG. 6 shows an installation region 60 for a fire protection device 61 according to a third exemplary embodiment of the present invention. Only the differences in comparison with the fire protection device according to the second exemplary embodiment are discussed below.

The installation region 60 has two carrier profiles 62, 63, which extend in the longitudinal direction of the aircraft and between them receive a floor panel 64, indicated by dashed lines. The carrier profiles 62 and 63 are in this case arranged on the dividing wall side and outer wall side respectively in relation to one another. The floor panel 64 thereby substantially forms the dividing wall 6, which together with the insulation 14 forms the gap 10 that is to be closed in the case of a fire.

The fire protection device 61 has a curtain 65, which is fastened at its one end 66 to the carrier profile 62 by means of screws 69, and a curtain 67, which is fastened at its one end 68 to the carrier profile 63 by means of screws 70. Preferably, the same screws with which the floor panel 64 is screwed to the carrier profiles 62, 63 are also used for this, in order to save parts and weight. It goes without saying that the screws 69, 70 may also be replaced by other fastening means.

Alternatively, the ends 66 and 68 of the curtains 65 and 67 may also be inserted into slits in the floor panel 64 and adhesively bonded there.

Figure 7:
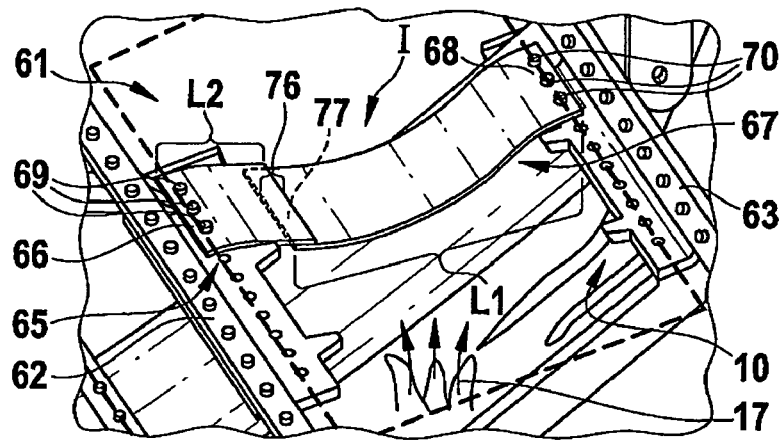
FIG. 7 shows the view from FIG. 6, the fire protection device having been installed in the installation region and being in a ventilating position.

At their other ends 74 and 75, respectively, the curtains 65 and 67 are fastened to one another in the ventilating position I represented in FIG. 7. For this purpose, the ends 74 and 75 overlap in a region 76, in which they are adhesively bonded to one another by means of an intumescent adhesive 77 (merely indicated by dashed lines because it lies between the ends 74, 75 and is therefore not visible). The curtains 65, 67 are respectively made up of one or more layers of glass fiber material (S-glass material or quartz glass fiber material). With preference, just one layer of fabric is used, the thickness of which is adapted in particular to the requirements with regard to the required fire resistance (i.e. the maximum heat effect over a predetermined time period until the layer of fabric burns through). In this case, the length L1 of the curtain 67 is much greater than the length L2 of the curtain 65.

Figure 8:
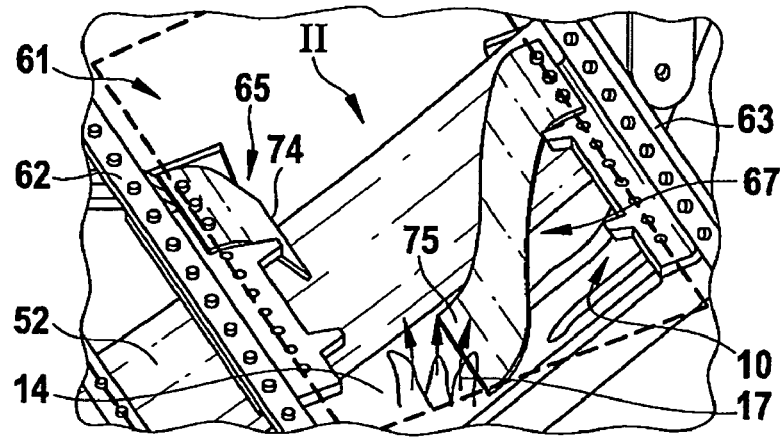
FIG. 8 shows the view from FIG. 7, the fire protection device being in the screening position.
Figure 9:
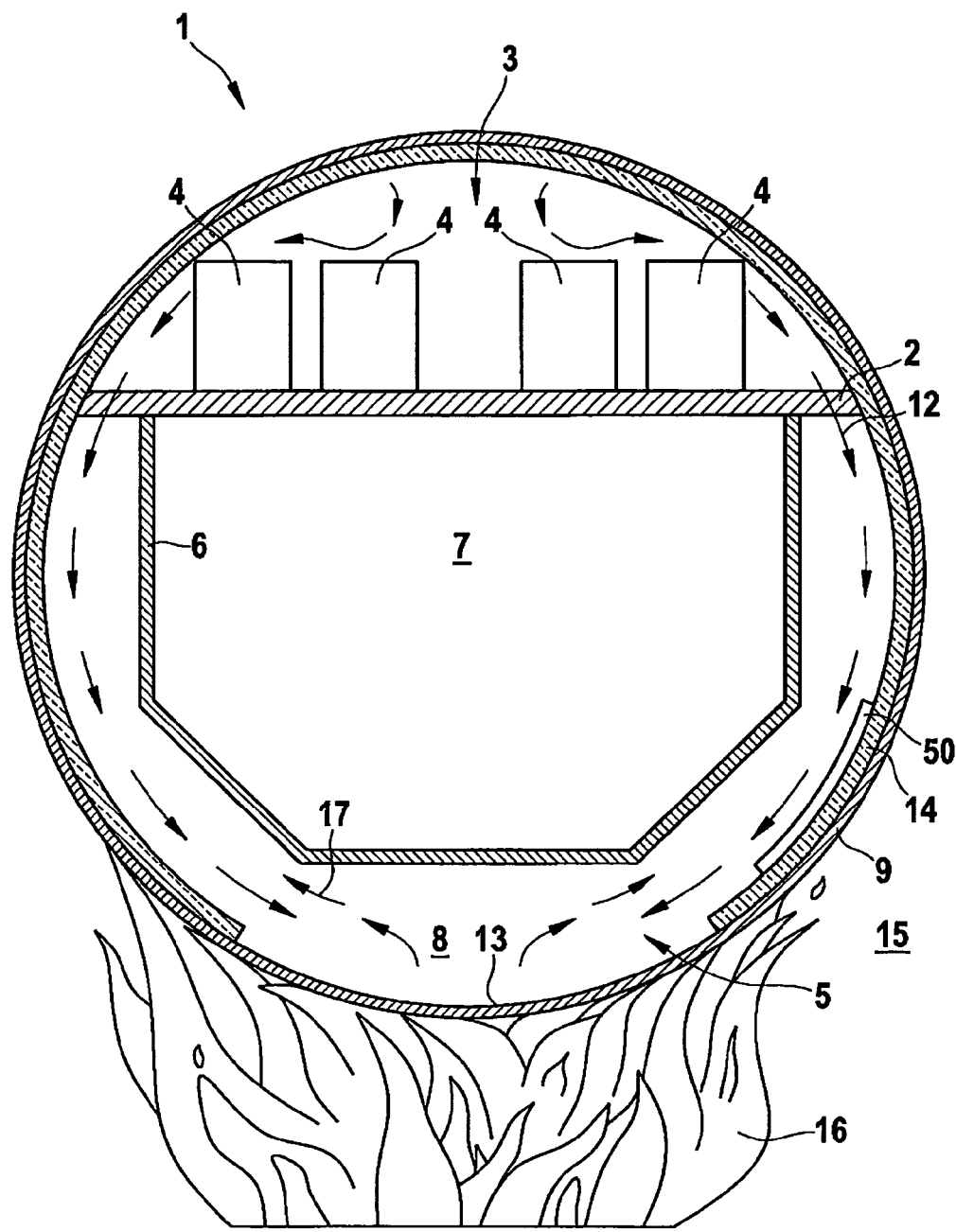
FIG. 9 shows a view of a conventional aircraft fuselage.

In the case of a fire, indicated by the stream of smoke and heat 17, the adhesive 77 expands and consequently no longer holds the ends 74, 75 together. On account of the gravitational force, the ends 74, 75 fall downwards, see FIG. 8. The end 75 then finishes substantially flush with the insulation 14 and consequently seals the gap 10. The curtain 67 acting as the fireproof bulkhead is then in the screening position II and penetration of the stream of smoke and heat into the cabin 3 is prevented.

Although the invention has been described here on the basis of exemplary embodiments, it is in no way restricted to these, but can be modified in various ways.

The present invention provides a fire protection device for an aircraft or spacecraft. The fire protection device is provided with a fireproof bulkhead and an adjusting device, by means of which the fireproof bulkhead can be adjusted from a ventilating position into a screening position. The idea on which the present invention is based is to prevent a stream of smoke and heat from penetrating into the cabin when there is a fire underneath the fuselage.

What is claimed is:

1. A fire protection device for an aircraft or spacecraft, the fire protection device comprising a fireproof bulkhead and an adjusting device by which the fireproof bulkhead can be adjusted from a ventilating position into a screening position, wherein the fireproof bulkhead is formed as a curtain; and
   wherein the curtain is fastened to a dividing wall of the aircraft or spacecraft or to an outer wall of the aircraft or spacecraft on at least one side by adhesive attachment or sewing.

2. The fire protection device according to claim 1, wherein, in the ventilating position, the fireproof bulkhead exposes a gap between the dividing wall and the outer wall of the aircraft or spacecraft for ventilating a fuselage floor.

3. The fire protection device according to claim 2, wherein, in the screening position, the fireproof bulkhead seals the gap to provide a screen against a fire in the region of the fuselage floor.

4. The fire protection device according to claim 1, wherein the adjusting device adjusts the fireproof bulkhead in the case of a fire from the ventilating position into the screening position.

5. The fire protection device according to claim 1, wherein the adjusting device has holding means, which hold the fireproof bulkhead in the ventilating position and, in the case of a fire, releases the fireproof bulkhead for movement of the same into the screening position.

6. The fire protection device according to claim 1, wherein a non-heat-resistant adhesive is used for the adhesive attachment.

7. The fire protection device according to claim 1, wherein a non-heat-resistant filament is used for the sewing.

8. The fire protection device according to claim 1, wherein the curtain fastened on at least one side comprises a first curtain fastened on the dividing wall and a second curtain fastened on the outer wall, the first curtain being fastened at one end to a structure on the dividing wall and the second curtain being fastened at one end to a structure on the outer wall, the first curtain and the second curtain being fastened to one another at respective other ends by a non-heat-resistant adhesive in the ventilating position, the respective other ends being disposed a length away from where the respective one end is fastened.

9. The fire protection device according to claim 8, wherein the respective other ends of the first and second curtains overlap in certain portions, and the non-heat-resistant adhesive is provided between the overlapping ends.

10. The fire protection device according to claim 8, wherein the second curtain has a greater length than the first curtain.

11. The fire protection device according to claim 1, wherein the adhesive is an intumescent material.

12. The fire protection device according to claim 1, wherein the fireproof bulkhead comprises at least one of a plastic, a glass fiber material, an S-glass, a glass fiber fabric, a metal, a metal alloy and a metal mesh.

13. Aircraft or spacecraft, with the dividing wall, the outer wall, and a gap between the dividing wall and the outer wall and a fire protection device according to claim 1.

14. A fire protection device for an aircraft or spacecraft, the fire protection device comprising a fireproof bulkhead and an adjusting device for adjusting the fireproof bulkhead from a ventilating position into a screening position, wherein the fireproof bulkhead has a first curtain on a dividing wall side of the aircraft or spacecraft and a second curtain on an outer wall side of the aircraft or spacecraft, the first curtain being fastened at one end to a structure on the dividing wall side and the second curtain being fastened at one end to a structure on the outer wall side, wherein the first curtain and the second curtain are fastened at respective other ends by a non-heat-resistant adhesive when in the ventilating position, the respective other ends being disposed a length away from where the respective one end is fastened.

* * * * *